United States Patent [19]

Kozachevsky et al.

[11] Patent Number: 4,799,919
[45] Date of Patent: Jan. 24, 1989

[54] COGGED BELT WITH REINFORCING MEMBERS

[76] Inventors: Gennady G. Kozachevsky, ulitsa Yakubovskogo, 18, korpus 2, kv. 271; Valery V. Guskov, ulitsa Kulman, 13, kv. 19; Vladimir P. Boikov, ulitsa Ya.Kolasa, 139, kv. 172; Oleg I. Molodan, ulitsa Slavinskogo, 15, kv. 63; Svetlana I. Sizova, ulitsa Ya.Kolasa, 139, kv. 172, all of Minsk, U.S.S.R.

[21] Appl. No.: 82,863
[22] PCT Filed: Sep. 19, 1985
[86] PCT No.: PCT/SU85/00078
 § 371 Date: May 4, 1987
 § 102(e) Date: May 4, 1987
[87] PCT Pub. No.: WO87/01779
 PCT Pub. Date: Mar. 26, 1987
[51] Int. Cl.⁴ ............................................. F16G 1/12
[52] U.S. Cl. .................................... 474/205; 474/268
[58] Field of Search ............. 474/268, 205, 270, 265, 474/240, 242, 244

[56] References Cited

U.S. PATENT DOCUMENTS 2,184,796  12/1939  Evans et al. ..................... 474/241
2,189,049  2/1940   Ungar ........................... 474/265 X
4,198,875  4/1980   Schneider ....................... 474/205

FOREIGN PATENT DOCUMENTS 652526   11/1937  Fed. Rep. of Germany .
3411772  5/1985   Fed. Rep. of Germany ...... 474/205
1033794  8/1983   U.S.S.R. .
1073511  2/1984   U.S.S.R. ........................ 474/205

Primary Examiner—Thuy M. Bui
Attorney, Agent, or Firm—Lilling & Greenspan

[57] ABSTRACT

A cogged belt comprising an elastic base (3) which incorporates a carrying element and a reinforcing element which reinforces; cogs (1) of the belt and is in the form of a corrugated strip. Corrugations (5) of the strip are imedded in the cogs (1). The reinforcing element (2) has a width equal to the width of the cog (1), whereas the carrying element is formed by locks (4) disposed in the zone of the corrugations (5) to powerlock their bases and portions (6) of the reinforcing element (2) interposed between the corrugations (5).

4 Claims, 1 Drawing Sheet

U.S. Patent    Jan. 24, 1989    4,799,919
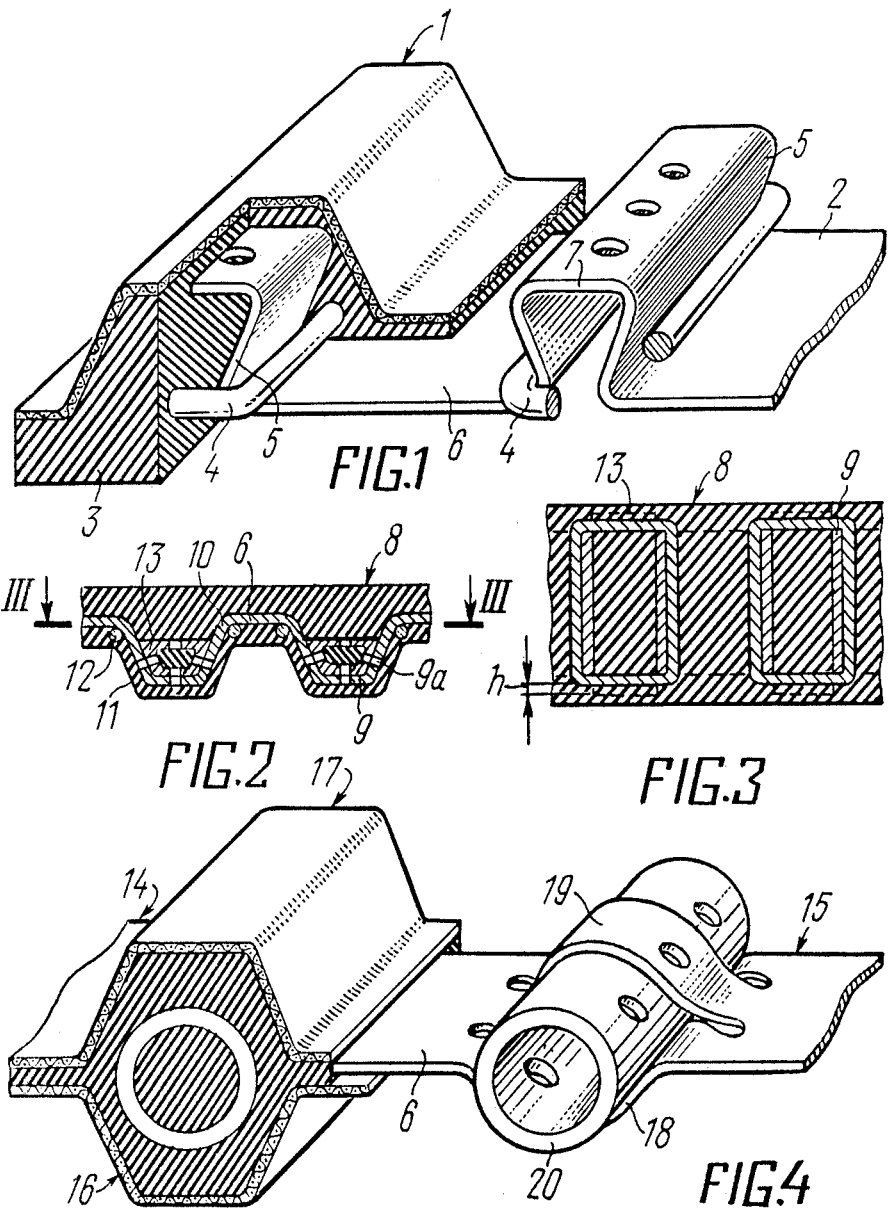

COGGED BELT WITH REINFORCING MEMBERS

BACKGROUND OF THE INVENTION

1. Field of the Invention

This invention relates generally to mechanical engineering, and more particularly to cogged belts of belt transmissions.

2. Description of the Prior Art

There is known a cogged belt comprising an elastic base of which incorporates a carrying element and an element reinforcing belt cogs in the form of a corrugated strip with the corrugations embedded in the cogs. The carrying element has ports in the location of the cogs, these ports receiving the corrugations of the reinforcing strip having a width corresponding to the width of the ports. An insert is provided inside the cog between the walls of the corrugation of the reinforcing element (cf., USSR Inventor's Certificate No. 1,073,511, published in Bulletin "Discoveries, Inventions, Industrial Designs, Trademarks" No. 6, 1984).

The provision in the carrying strip of the ports receiving the corrugations of the reinforcing strip disturbs the integrity of the carrying element. Since the reinforcing element has a width equal to the width of the ports, the carrying capacity of the belt is affected because the force transmitted by the belt is taken up by the reinforcing element at portions comprising the corrugations, and by the carrying element at the portions between the corrugations to result in reduced carrying capacity of the cogged belt. In addition, the use of two layers, viz., carrying and reinforcing layers, makes the manufacture of the belt more expensive.

SUMMARY OF THE INVENTION

The invention aims at providing a cogged belt, in which a carrying element is constructed so as to ensure a higher carrying capacity of the belt and make the cogged belt less expensive to fabricate.

The aims of the invention are attained by a cogged belt comprising an elastic base of which incorporates a carrying element and an element reinforcing the belt cogs in the form of a corrugated strip with corrugations thereof embedded in the cogs. According to the invention, the reinforcing element has a width substantially equal to the width of the belt cog, and the carrying element is formed by locks disposed in the zone of the corrugations for power-locking their bases and portions of the reinforcing element interposed between the corrugations.

Preferably, each corrugation has the form of a trapezoid having its major base facing the vertex of the cog, whereas the lock is fashioned as a rectangular frame embracing the corrugation at the minor base.

Such an arrangement of the corrugations ensures a higher resistance to the action of tensile stresses exerted on the carrying element, whereas the lock is structurally quite simple.

Alternatively, each corrugation has the form of a trapezoid having its major base the vertex of the belt cog, whereas the lock is fashioned as a rectangular frame embracing the corrugation at its major base, the interior of the corrugation accommodating an insert having a length exceeding the length of the lock cross-sectionally of the belt.

This construction of the cogged belt prevents the tendency of the corrugations to stretch, even when high loads are imparted thereto.

Alternatively, the element reinforcing the cogs of the belt has longitudinally extending cuts in the zone of arrangement of the cogs to form corrugations at both sides of the reinforcing element, whereas the lock is fashioned as an insert placed between the corrugations with an interference fit.

The just described arrangement of the reinforcing element and lock is employed during fabrication of two-sided cogged belts of high cog rigidity.

The cogged belt embodying the present invention offers a higher cog rigidity as compared with prior art one- and two-sided cogged belts. Cogged belts of the herein proposed construction are virtually free from the tendency to form fatigue cracks at the cog base, whereas their side surface lasts longer than that of the known belt cogs. In addition, the proposed cogged belts are relatively inexpensive to manufacture.

BRIEF DESCRIPTION OF THE DRAWINGS

FIG. 1 is an axonometric view of a cogged belt according to the invention;

FIG. 2 is a longitudinal sectional view of the proposed cogged belt with a lock and insert;

FIG. 3 is a section taken along the line III—III in FIG. 2; and

FIG. 4 is an axonometric view of a two-sided cogged belt according to the invention.

DESCRIPTION OF THE PREFERRED EMBODIMENT

A cogged belt comprises a reinforcing element 2 (FIG. 1) reinforcing cogs 1 and having the form of a corrugated strip, an elastic base 3, and a carrying element formed by locks 4 arranged in the area of corrugations 5 to power-lock their bases and portions 6 of the reinforcing element 2 between the corrugations 5.

The corrugations 5 have the form of a truncated wedge or trapezoid having its major base 7 facing the vertex of the cog 1 of the belt, the lock 4 having the form of frame embracing the corrugation 5 at the small base of the trapezoid.

With reference to FIGS. 2 and 3, in a cogged belt 8 corrugations 9 of a reinforcing element 10 have the form of a having its minor base facing the vertex of a cog 11. A lock 12 is fashioned as a rectangular frame to embrace the corrugation 9 at its major base. Arranged inside the corrugation 9 is an insert 13 having a length somewhat exceeding the length of the lock 12 cross-sectionally of the cogged belt by a magnitude $2h$ (FIG. 4) to ensure fixed locking of the corrugation 9.

In the embodiment described the insert 13 is hollow filled on the inside with the material of the elastic base 3 for which purpose the corrugations are provided with through holes 9a. The carrying element is formed by the lock 12, insert 13 and portions 6 of the reinforcing element 10 disposed between the corrugations 9.

Referring now to FIG. 4, a two-sided cogged belt 14 comprises an element 15 to reinforce cogs 16 and 17 of the belt 14. The reinforcing element is provided in the zoe of the cogs 16, 17 with longitudinal cuts to facilitate the formation of corrugations 18 and 19 at both sides of the reinforcing element 15. An insert 20 in the form of a lock is inserted with an interference fit between the corrugations 18 and 19. The locks and portions 6 of the element 15 reinforcing the cogs 16, 17 interposed between the adjacent cogs 16, 17 form the carrying element of the cogged belt 14.

The cogged belt of a cogged belt transmission operates in the following manner.

During operation of the proposed cogged belt transmission cogs 1 engage with the teeth of a pulley (not shown), whereby power is transmitted. At the sections of the belt interposed between the cogs 1 the loads are taken up mostly by the portion 6 of the reinforcing element 2. The cogs 1 of the belt, while engaging with the teeth of the pulley, experience a tangential force causing fatigue failure in the form of cracks at the base of the cogs 1 of the belt.

As the corrugations 5 of the reinforcing element 2 are embedded in the cogs 1, shear stresses taking place in the cogs of conventional belts are replaced by compressive stresses, which obviates such a factor conductive to damage due to fatigue crack formation at the base of the cog 1.

Increased rigidity of the cogs 1 of the belt by embedding therein the corrugations 5 of the reinforcing element 2 reduces wear of the cogs 1 due to reduced interference of the cogs as they are brought into engagement.

The invention is most preferable for use in cogged belt power transmissions.

We claim:

1. A cogged belt comprising an elastic base (3) which incorporates a carrying element and a reinforcing element (2, 10, 15) which reinforces cogs (1, 11, 16, 17) of the belt and is in the form of a corrugated strip corrugations of which are embedded in the cogs (1, 11, 16, 17) of the belt, wherein said reinforcing element (2, 10, 15) has a width substantially equal to the width of the cog (1, 11, 16, 17), the carrying element being formed by locks (4, 12, 20) disposed in the zone of the corrugations (5, 9, 18, 19) for power-locking said reinforcing element (2, 10, 15) interposed between said corrugations (5, 9, 18, 19).

2. A cogged belt as claimed in claim 1, wherein each cog has a base and a vertex and each corrugation (5) has the form of a trapezoid having major and minor bases, its major base facing the vertex of the cog (1), whereas the lock (4) comprises a rectangular frame embracing the corrugation (5) at the minor base thereof.

3. A cogged belt as claimed in claim 1, wherein each corrugation (9) has the form of a trapezoid having its minor base the vertex of the cog (11), whereas the lock (12) is fashioned as a rectangular frame embracing the corrugation (9) as its major base, the interior of the corrugation (9) accommodating an insert (13) having a length exceeding the length of the lock (12) cross-sectionally of the belt (8).

4. A cogged belt as claimed in claim 1, wherein the element (15) reinforcing the cogs (16, 17) of the belt has longitudinal cuts in the zone of arrangement of the cogs (16, 17) to form the corrugations (18, 19) at both sides of the reinforcing element (15), whereas the lock (20) is fashioned as an insert placed between the corrugations (18, 19) with an interference fit.

* * * * *